(12) United States Patent
Jeon (10) Patent No.: US 7,616,918 B2
(45) Date of Patent: Nov. 10, 2009

(54) IMAGE FORMING APPARATUS AND COLOR REGISTRATION METHOD THEREOF

(75) Inventor: Wan Joon Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 11/949,219

(22) Filed: Dec. 3, 2007

(65) Prior Publication Data

US 2008/0089704 A1    Apr. 17, 2008

(30) Foreign Application Priority Data

Dec. 15, 2006    (KR) .................... 10-2006-0128366

(51) Int. Cl.
*G03G 15/01* (2006.01)
(52) U.S. Cl. ..................................... 399/301
(58) Field of Classification Search ............ 399/38, 399/72, 297, 298, 299, 301
See application file for complete search history.

(56) References Cited

U.S. PATENT DOCUMENTS

| 6,903,758 B1 * | 6/2005 | Kerxhalli et al. ............. 347/116 |
| 7,110,687 B2 * | 9/2006 | Furukawa .................... 399/49 |
| 7,177,585 B2 * | 2/2007 | Matsuzaka et al. .......... 399/394 |

FOREIGN PATENT DOCUMENTS

KR    2003-136794    5/2003

* cited by examiner

*Primary Examiner*—Hoan H Tran
(74) *Attorney, Agent, or Firm*—Stein McEwen, LLP (57) ABSTRACT

An image forming apparatus, and a method for performing an auto color registration. The method includes inspecting a test pattern printed on a paper. A distance between two predetermined points in the test pattern is measured. An X offset in a horizontal direction, and a Y offset in a vertical direction paper transfer direction, are correctly set.

23 Claims, 7 Drawing Sheets

FIG.1

(Related Art)

FIG.2

(Related Art)

IMAGE FORMING APPARATUS AND COLOR REGISTRATION METHOD THEREOF

CROSS-REFERENCE TO RELATED APPLICATIONS

This application claims the benefit of Korean Application No. 2006-128366, filed Dec. 15, 2006, in the Korean Intellectual Property Office, the disclosure of which is incorporated herein, by reference.

BACKGROUND OF THE INVENTION

1. Field of the Invention

Aspects of the present invention relate generally to an image forming apparatus and an auto color registration method thereof.

2. Description of the Related Art

An image forming apparatus can be a color laser printer, fax machine, photocopier, or the like. In an image forming apparatus a photosensitive medium is charged, a laser beam is scanned onto the photosensitive medium, to selectively expose the medium, and thereby form a latent electrostatic image. The latent electrostatic image is developed with toner of a predetermined color, using a developing device, to form a developed latent electrostatic image. The developed latent electrostatic image is transferred onto a printing medium, through pressurization and heating, thereby forming a printed image.

In general, yellow (Y), magenta (M), cyan (C) and black (B) colored toners are used in a developing device. Single color images, each comprising one of the four toners, are overlapped with one another, thereby forming a complete image. To provide a high quality image, the single color images are precisely overlapped with one another.

Errors can occur because of the misalignment of the single color images in a developing device. Errors can occur when processing using an optical lens, which can cause registration errors in a color image. For this reason, there is a need for an auto color registration operation that reduces such errors.

Figure 1:
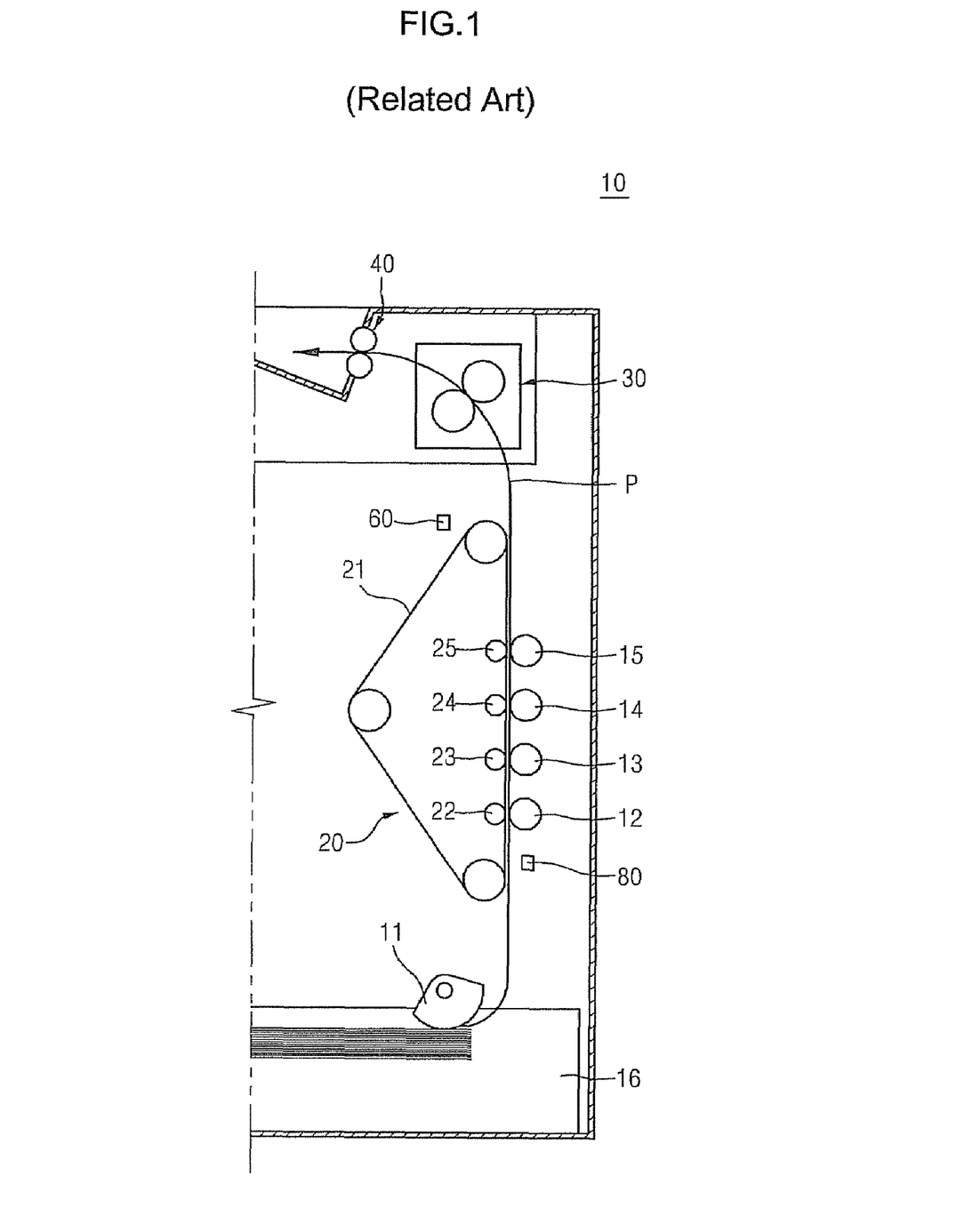
FIG. 1 is a view schematically illustrating an internal structure of a conventional tandem color laser printer.

The occurrence of the auto color registration errors is an important factor, particularly in a single-pass color image forming apparatus having a plurality of color units arranged in series in a developing device. A tandem color laser printer 10, shown in FIG. 1, is a color image forming apparatus having such a structure.

When printing instructions are received by the color laser printer 10, a single color image is formed on each of photosensitive drums 12, 13, 14 and 15. After the images are formed, a pick-up roller 11 picks up paper S stacked in a paper feeding unit 16, to convey it toward a transfer unit 20. Paper, as referred to herein, includes any printable medium, for example, printer paper, fax paper, transparencies, and the like. The paper P passes between a paper transfer belt (PTB) 21, of the transfer unit 20, and the photo sensitive drums 12, 13, 14, and 15. The unit images for each color, are formed on the respective photosensitive drums 12, 13, 14, and 15 and are each transferred, in an overlapping fashion, onto the paper S, by corresponding transfer rolls 22, 23, 24, and 25. The paper S then passes through a fixing unit 30. The fixing unit 30 heats and presses the paper S, such that the images are fixed thereon. The paper S is then discharged from the color laser printer 10, via a paper discharging unit 40.

The printer 10 includes a feeding sensor 80 that senses the presence of the paper S that is fed through the printer 10. The printer 10 controls the timing and/or speed at which the paper S is fed to the photosensitive drums 12, 13, 14, and 15, and detects paper jams, using the feeding sensor 80.

Figure 2:
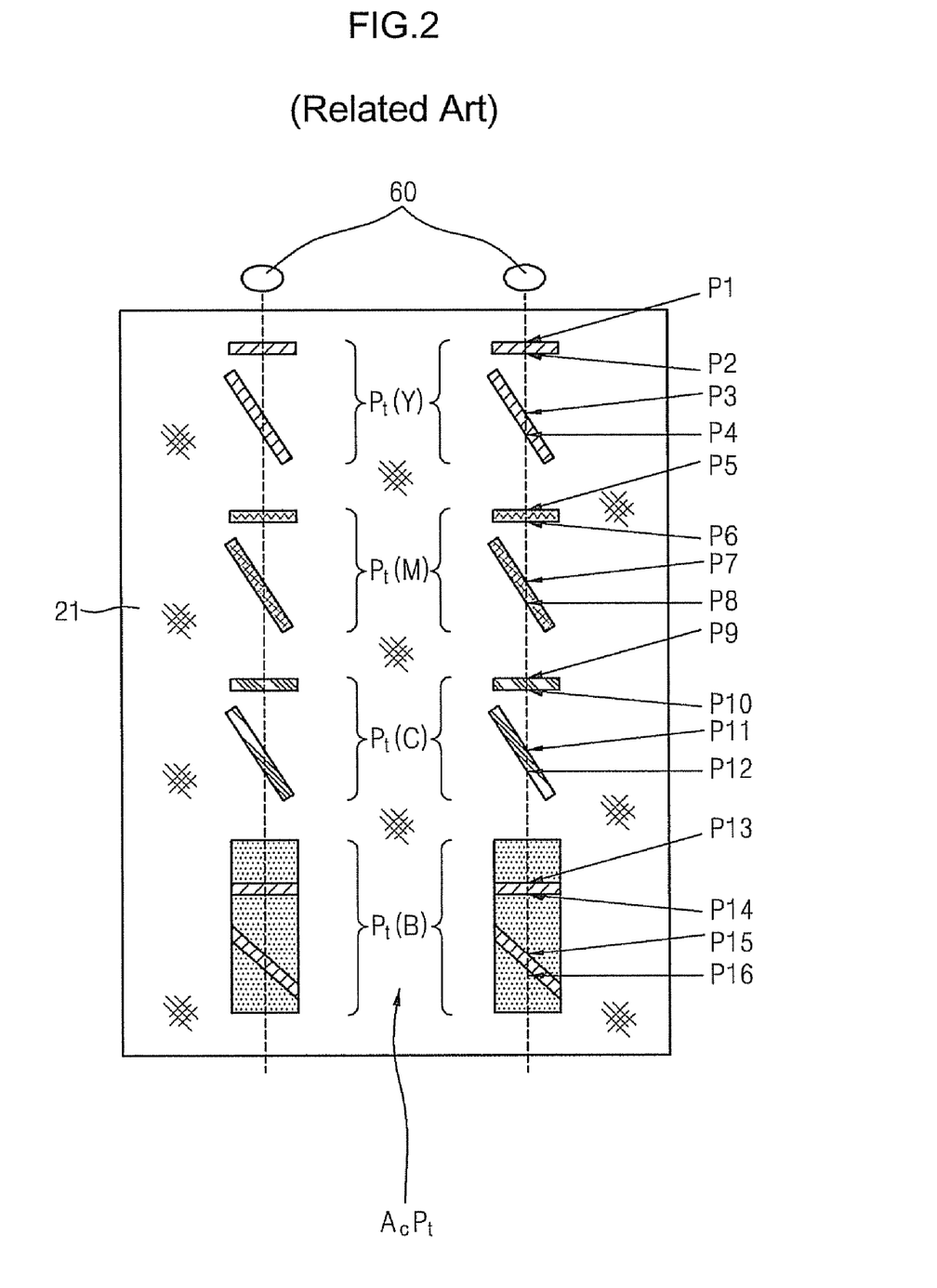
FIG. 2 is a view illustrating an auto color registration pattern, printed at a paper transfer belt, for the purpose of performing a conventional auto color registration operation.

The printer 10 includes a color registration sensor 60 disposed at one side of the PTB 21. As illustrated in FIG. 2, a color image pattern (test pattern) AcPt is printed at the PTB 21. The test pattern AcPt includes a plurality of color patterns Pt(Y), Pt(M), Pt(C), and Pt(B), respectively corresponding to the four colors of yellow (Y), magenta (M), cyan (C), and black (B).

The color registration sensor 60 receives light reflected from each of the color patterns, and then outputs a corresponding sensing signal. The color registration sensor 60 can recognize the positions P1 to P16, of the test pattern AcPt, using the structure of the test pattern. Through such pattern position recognition, the position of another color pattern is adjusted with respect to the position of any one color pattern, as a reference. Thus, the images for each color can be corrected to overlap with each other.

The aforementioned auto color registration method has a disadvantage in that while an image registration error for each color can be corrected, the method cannot be used to determine whether the position of a test pattern, partially printed on a paper, is correct. In a conventional method, because an image registration operation for each color is performed on the basis of an entire test pattern, it cannot be assured that a color image printed on a paper is properly positioned with respect to the paper. In general, an X offset in a horizontal direction and a Y offset in a paper transfer (vertical) direction are predetermined as reference information, allowing a color image to be positioned at the correct position on a paper. A color image is printed on a paper on the basis of the X and Y offsets. Since either of the X and Y offsets can be inappropriately set, or a scanning speed error of an LSU (Laser Scanning Unit), provided for each color to expose a respective photosensitive medium, occurs as the number of printing operations increases (although such X and Y offsets are appropriately set), a color image may not be printed at a correct position on a paper.

In a shuttle-type cartridge inkjet printer, auto color registration is performed by printing a test pattern for color registration, scanning the test pattern with a scanner, and then analyzing the scanned image. However, such scanning is inconvenient. A program tool for precisely analyzing a scanned image should be provided. Moreover, the auto color registration cannot be applied to color laser printers that do not have scanners.

SUMMARY OF THE INVENTION

Accordingly, aspects of the present invention are directed to solving at least the above-mentioned problems. An aspect of the present invention is to provide an image forming apparatus and an auto color registration method thereof, wherein a test pattern, printed on a paper, is inspected using a sensor, without an additional scanning operation. This allows offset information to be set, to allow a color image to be correctly positioned.

The foregoing and/or other aspects of the present invention are achieved by providing an image forming apparatus comprising: a printing unit to print color patterns, each color pattern corresponding to a different color, and comprising a reference pattern aligned on a paper in an X-axis direction, and an inspection patterns inclined relative to the reference pattern by a predetermined angle; a color registration sensor to sense positions of the reference pattern and the inspection patterns; a controller to detect a first point of the reference pattern, a second point of the inspection pattern, and a position of the test pattern on the paper, by detecting an edge of the paper which is parallel to the X-axis direction; and an offset setting unit to set an X offset and a Y offset of the color image, according to the position of the test pattern.

According to various embodiments, the controller measures a first distance between the edge of the paper, which is parallel to the X-axis direction, and the first point or the second point, and sets the Y offset in accordance with the measured first distance.

According to various embodiments, the controller measures the distance based on a time interval between a first point sensing time and a second point sending time, and a paper transfer speed.

According to various embodiments, the controller measures a second distance between the reference pattern and the inspection pattern, and sets the X offset in accordance with the measured second distance.

According to various embodiments, the color registration sensor is provided in a vicinity of the paper transfer path.

According to various embodiments, the color image sensor is an optical sensor.

In another aspect, there is provided an auto color registration method of an image forming apparatus, the method comprising: printing color patterns on a paper; sensing positions of the color patterns on the paper, by detecting first and second points of at least one color pattern, and detecting an edge of the paper, which is parallel to the X-axis direction; and setting an X offset and a Y offset of a printed color image, according to the detected position of the color pattern.

According to various embodiments, each color pattern includes a reference pattern having a long axis in an X-axis direction of the paper, and an inspection pattern having a long axis inclined relative to the long axis of the reference pattern, by a predetermined angle.

According to various embodiments, a first distance between the first point and the edge is measured in the position sensing step, and the first distance is compared with a first reference distance, in the Y offset setting operation.

According to various embodiments, a second distance between the first and second points is measured in the position sensing step, and the Y offset is set by comparing the first distance with a first reference distance.

According to various embodiments, the first point is aligned on the reference pattern and the second point is aligned on the inspection pattern.

According to various embodiments, the first and second points are aligned in a Y-axis direction which is perpendicular to the X-axis direction.

According to various embodiments, the first and second points are detected from each color pattern in the position sensing operation.

According to various embodiments, a paper transfer time is adjusted according to a comparison result between the first distance and the reference distance, in the Y offset setting operation.

According to various embodiments, in the first distance measurement operation, a time interval, between a first time point for sensing the edge and a second time point for sensing the first point, is multiplied by a paper transfer speed.

According to various embodiments, in the second distance measurement operation, a time interval between a first time point for sensing the first point and a second time point for sensing the second point is multiplied by a paper transfer speed.

Additional aspects and/or advantages of the invention will be set forth in part in the description that follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An image forming apparatus, according to aspects of the present invention, is not limited to only a tandem laser printer, but may be applied to a single-pass color image forming apparatus, provided with a structure in which a plurality of developing devices for each color are arranged in series. Here, components of the present invention, with the same functions as conventional components, will be described by providing them with the reference numerals described in FIG. 1. As referred to herein, "paper" refers to any printable medium, for example, sheets of paper, transparency sheets, and the like.

As show in FIG. 1, an image forming apparatus 10, according to aspects of the present invention, includes: a pick-up roller 11; a plurality of photosensitive drums 12, 13, 14, and 15; a paper feeding unit 16; a transfer unit 20; transfer rollers 22, 23, 24, and 25; a fixing unit 30; and a paper discharging unit 40. Single color images are formed on the photosensitive drums 12, 13, 14, and 15, with each color image, corresponding to a particular color used to print a color image. The colors can be, for example, yellow (Y), magenta (M), cyan (C), and black (B). The pick-up roller 11 picks up paper S, stacked in the paper feeding unit 16. The paper S is conveyed toward the transfer unit 20, and the respective photo sensitive drums 12, 13, 14, and 15 by a paper transfer belt 21 of the transfer unit 20. Single color images, formed on the respective photosensitive drums 12, 13, 14 and 15, are respectively transferred onto the paper by corresponding transfer rollers 22, 23, 24, and 25. The single color images are overlapped with one another, during the transfer. The paper S, including the images, passes through the fixing unit 30 that applies a high-temperature and pressure, to form a fixed image. The paper S is then discharged from the color laser printer 100, through the paper discharging unit 40.

The image forming apparatus 100 can further include a feeding sensor 80, mounted on a paper transfer path P, and disposed upstream from the photosensitive drums 12, 13, 14, and 15. The feeding sensor 80 can sense the presence of the paper S. The laser color printer 100 controls timing and/or speed at which the paper S is fed to the photosensitive drums 12, 13, 14, and 15, and recognizes the presence of a paper jam using a paper-feeding signal from the feeding sensor 80. The image forming apparatus 100 can further include a color registration sensor 60 disposed on the paper transfer path TP, so as to sense a test pattern printed on a paper.

Figure 3:
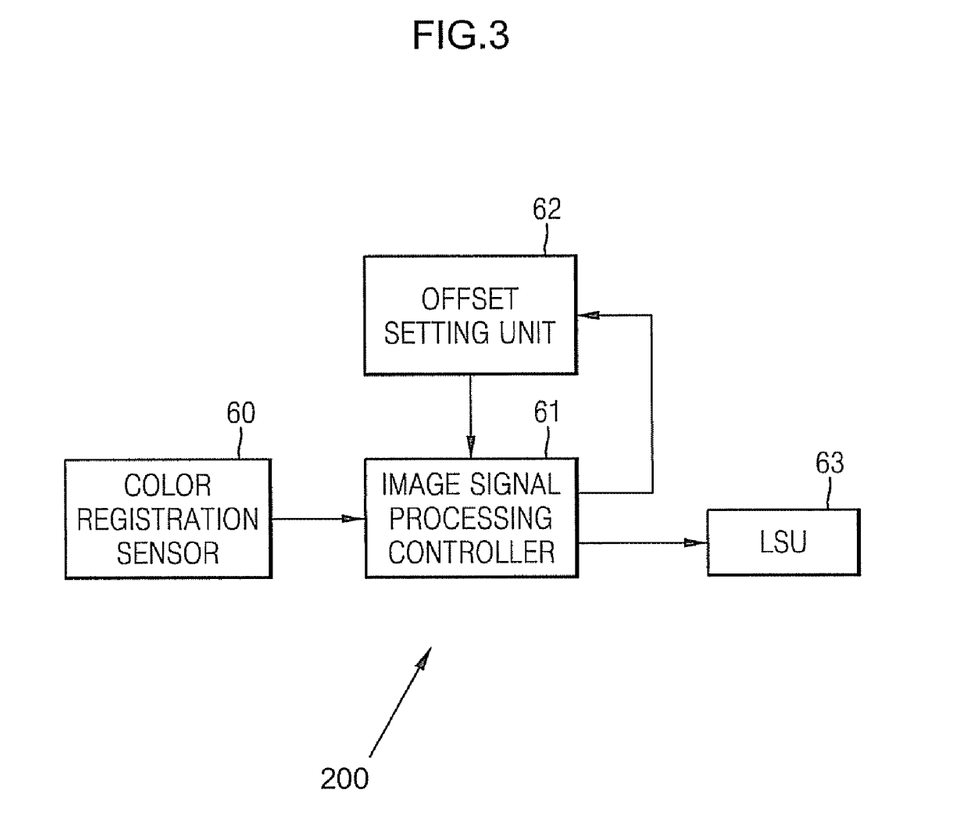
FIG. 3 is a block diagram illustrating a configuration of an auto color registration apparatus, according to aspects of the present invention.
Figure 4:
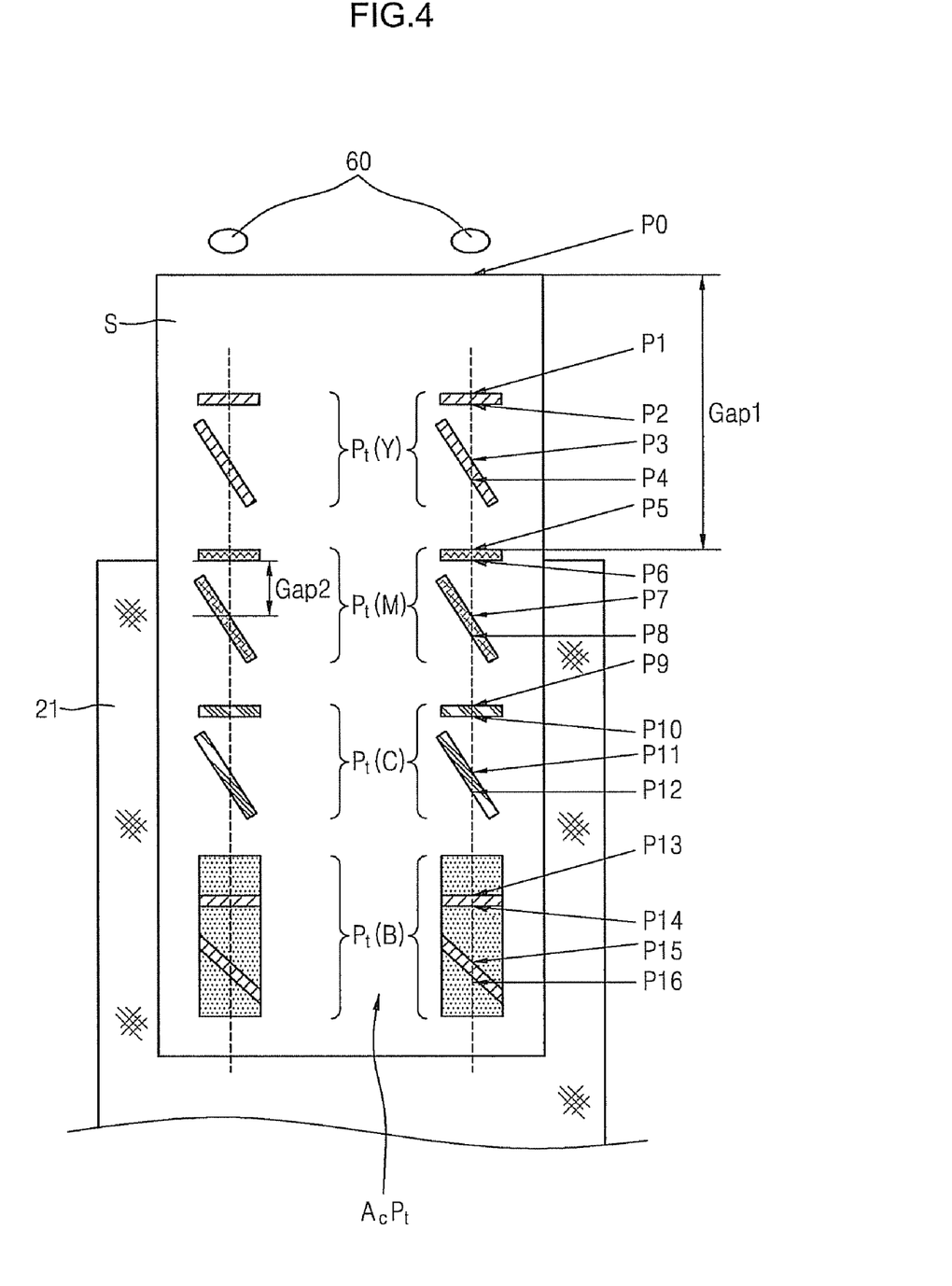
FIG. 4 is a view illustrating an auto color registration pattern printed on a paper for the purpose of performing an auto color registration operation, according to aspects of the present invention.

FIG. 3 is a block diagram illustrating a configuration of an auto color registration apparatus 200, according to aspects of the present invention, and FIG. 4 is a view illustrating an auto color registration pattern, printed on paper, for an auto color registration operation, according to aspects of the present invention.

The auto color registration apparatus 200 can comprise: an image signal processing controller 61; an offset setting unit 62; and an LSU 63. The image signal processing controller 61 applies a control signal, for forming a color image, to the LSU 63, by returning offset information provided from the offset setting unit 62. The LSU 63 forms a latent electrostatic image on a photosensitive medium, for each color under the control of the image signal processing controller 61.

To perform an auto color registration operation, a test pattern AcPt is printed on a paper S and the paper is transferred to the color registration sensor 60 along a paper transfer direction. The paper transfer direction is generally a direction oriented along the length of the paper. The test pattern AcPt includes a plurality of color patterns Pt(Y), Pt(M), Pt(C), and Pt(B), respectively corresponding to the four colors of yellow (Y), magenta (M), cyan (C), and black (B). The color patterns Pt(Y), Pt(M), Pt(C), and Pt(B) can each comprise a reference pattern having a long axis that extends across the width of the paper in an X direction, as discussed below, and an inspection pattern having a long axis that extends at an angle thereto. The angle can be, for example, 45 degrees.

The color registration sensor 60 senses the test pattern AcPt and sends a pattern signal to the image signal processing controller 61. The color registration sensor 60 can be any suitable optical sensor having light emitting and receiving elements.

An auto color registration operation may be performed in accordance with a user's settings and/or instructions. An auto color registration operation may be automatically performed after a set number of pages have been printed. An auto color registration operation may be performed when the apparatus is started, by turning on a power source of the apparatus or after a printing operation is ended according to power off instruction so as to turn off the power source by turning off the power source. Image registration modes, for an auto color registration operation, can be set by a user using any suitable user interface known in the art.

The image signal processing controller 61 can recognize points P1 to P16, disposed in the test pattern AcPt, on the basis of the pattern signal. The alignment of each color pattern is adjusted using the alignment of a different color pattern, as a reference. Thus, the single color images for each color can be adjusted to properly overlap with each other.

Separately from the registration operation for each color, the image signal processing controller 61 can measure a distance between two predetermined points, using a sensing signal of the color registration sensor 60. The controller 61 can reset an X and/or a Y offset, such that an image is correctly positioned on a paper, by using the distance measurement.

As shown in FIG. 4, the image signal processing controller 61 sets the Y and X offsets, on the basis of first and second distances Gap1 and Gap2, respectively. The first distance Gap1 may be obtained by multiplying a first required time t1 by a paper transfer speed v1. The first required time t1 is the time between when a point P0, of the paper S, is scanned and when the point P5 is scanned. The point P0 can be a top edge of a paper. The first distance Gap1 can be expressed by the following formula: Gap1=t1*v1. For example, as the paper S is moving along a paper transfer (vertical) direction, the time between when the point P0 is scanned and when the fifth pattern position P5 is scanned, is determined. This time is multiplied by the paper transfer speed v1.

In this embodiment, the top edge of the paper S and the point P5 are used as targets to define the first distance Gap1, however, the present teachings are not limited thereto. Any two points, separated from each other at a certain distance along a proceeding direction, can be selected. The distance between the two points can be measured using a time difference between when the points are detected and a paper transfer speed. Here, assuming that the paper transfer speed is predetermined, and there is no error, the distance measurement substantially depends on the sensing time of the two points.

The Y offset relates to the position of an image along a Y direction on a paper. The Y direction can extend vertically (along the length a paper). The X offset relates to the position of an image along an X direction on the paper. The X direction can extend horizontally (along the width of a paper). X and Y directions are perpendicular to each other. The precise orientation of the X and Y directions with respect to the paper is not critical to the present teachings.

The Y offset can be adjusted by changing the transfer speed of paper to the transfer unit 20. The Y offset can be adjusted by changing the time when printing begins after the paper S has entered the transfer unit 20. If the printing time is delayed, a printed image will be moved away from point P0. If the printing time is accelerated, a printed image will be moved closer to point P0.

If the measured first distance Gap1 is compared with a predetermined first reference distance, and the first distance Gap1 is determined to be shorter than the first reference distance, the Y offset is incorrect and should be set or reset. The Y offset can be reset such that the printing time of a color image is advanced, with respect to the paper transfer direction. If the first distance Gap1 is longer than the first reference distance, the Y offset is reset such that the printing time of a color image is delayed with respect to the paper transfer direction. The Y offset can be adjusted according to signals output to the offset setting unit 62 from the image signal processing controller 61.

As shown in FIG. 4, the second distance Gap2 is printed on the paper S. The second distance Gap2 may be obtained by multiplying a second required time t2, that corresponds to the time between when the sixth pattern position P6 (corresponding to the second pattern Pt(M) of the magenta M) is sensed and the seventh pattern position P7 is sensed, multiplied by a paper transfer speed v1. This can be expressed by the following formula: Gap2=t2*v1. Here, it is assumed that the paper transfer speed is identical to when the first distance Gap1 is measured.

Although the point P6 and the point P7 are used as end points to define the second distance Gap2 in this embodiment, the present teachings are not limited thereto. For example, any two points along the paper transfer direction, with which the position of an image can be inspected, may be used as end points. For example, the points P2 and P3 corresponding to the color pattern Pt(Y), or the points P10 and P11 corresponding to the color pattern Pt(C), or the points P14 and P15, of the color pattern Pt(B), can be used to determine a distance gap.

Figure 5A:
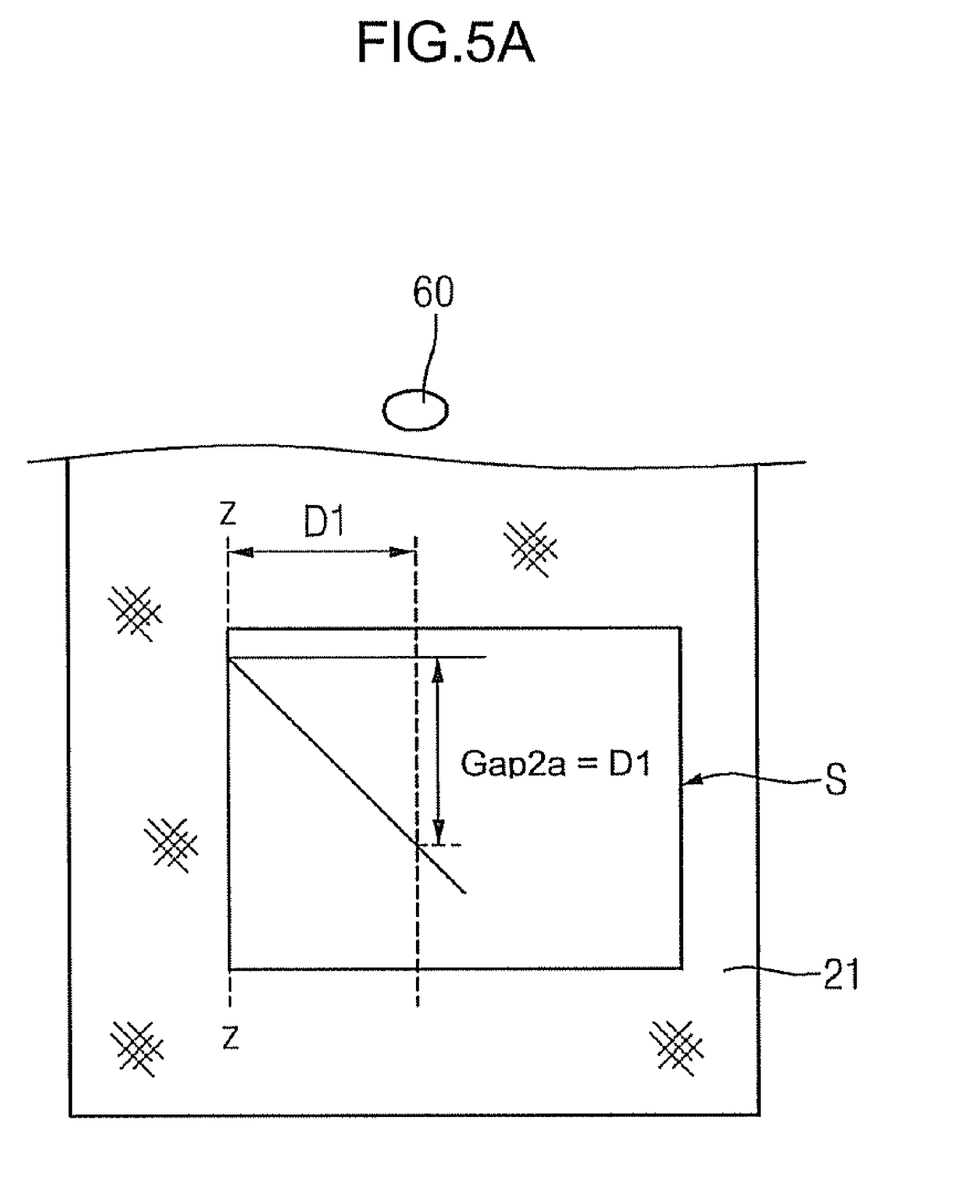
FIG. 5A is an exemplary view illustrating a case where an X offset is not required to be corrected because a test is printed at the correct position on a paper, as a result of inspecting a test pattern in an auto color registration operation, according to aspects of the present invention.

As shown in FIG. 5A, if a distance Gap2a is equal to a second reference distance D1, an X offset is not required to be corrected, because a test pattern is printed at a correct position on a paper S. Here, the second reference distance D1 corresponds to a distance between a reference line Z-Z, of the paper S, and a point spaced apart from the reference line. Reference line Z-Z can run along a vertical edge of the paper S. The second reference distance D1 corresponds to a distance from a reference pattern to an inspection pattern, of a color pattern. Accordingly, it can be determined whether or not the current X offset is appropriate by comparing the measured distance Gap2a with the second reference distance D1. For example, the angle of an inspection pattern with respect to a reference pattern will cause different distances to be detected, between two vertically aligned points disposed respectively thereon, if a color pattern is aligned to the left of right with respect to the color registration sensor 60. Therefore, this distance can be compared to a reference distance to determine the horizontal orientation of a color pattern.

Figure 5B:
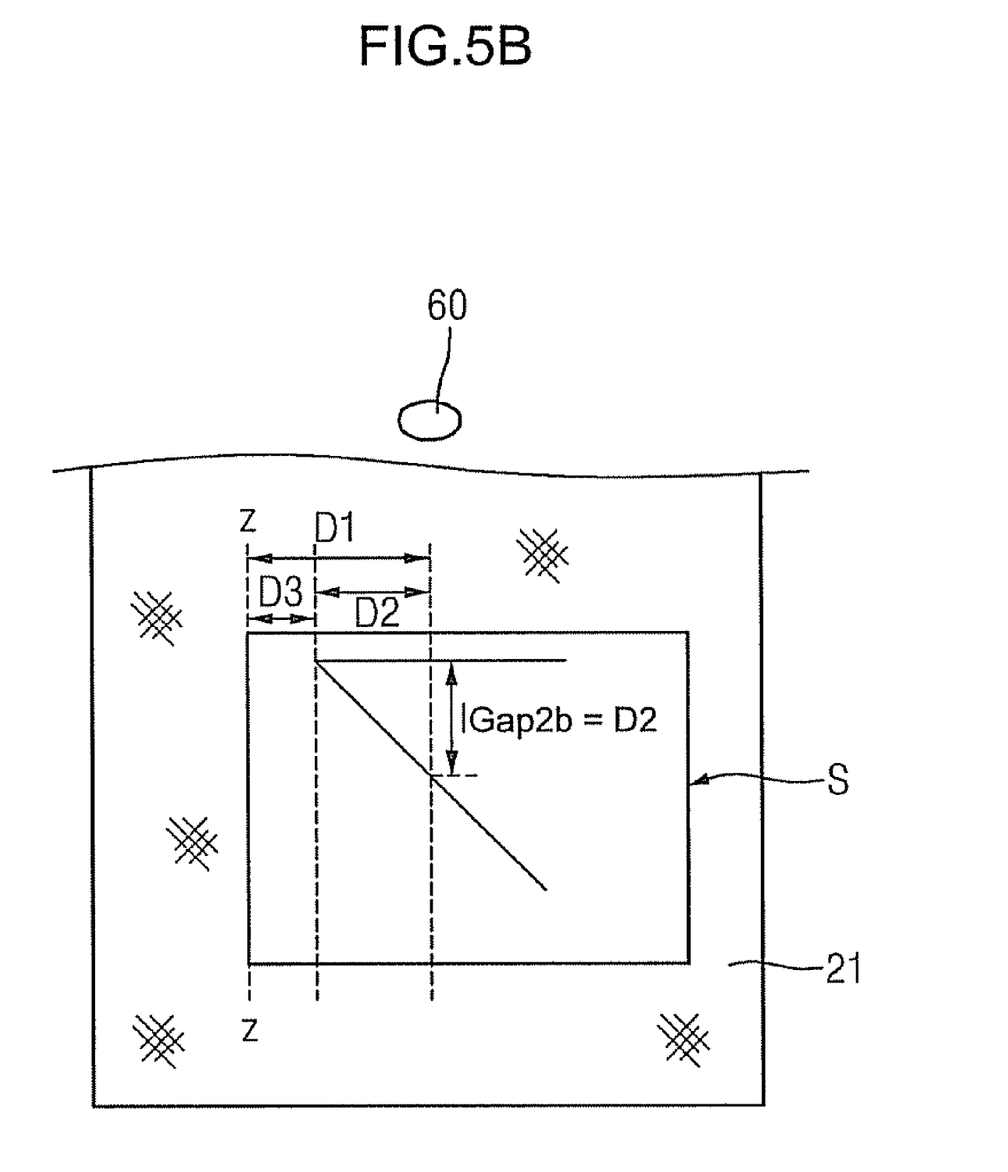
FIG. 5B is an exemplary view illustrating a case where an X offset is required to be corrected because a test is printed to be positioned to the right from a reference position on a paper as a result of inspecting a test pattern in an auto color registration operation, according to aspects of the present invention.

As shown in FIG. 5B, if a distance Gap2b, is less than the second reference distance D1, a test pattern is printed incorrectly positioned to the right on the paper S. In this case, the X offset is reset to solve such an error. That is, assuming that the test pattern printed is printed to the right, on the paper S, by a distance D3 from the reference line z-z of the paper, the distance Gap2b becomes a distance D2. The distance D2 is equal to the second reference distance D1 minus the distance D3. In this case, the image signal processing controller 61 outputs an X offset setting signal, to correct the X offset, to the offset setting unit 62. The printing position of a respective photosensitive drum can thereby be moved to the left such that a color image will be printed to the left, by the distance D3. The offset setting unit 62 provides the corrected X offset to the image signal processing controller 61, hereafter.

Figure 6:
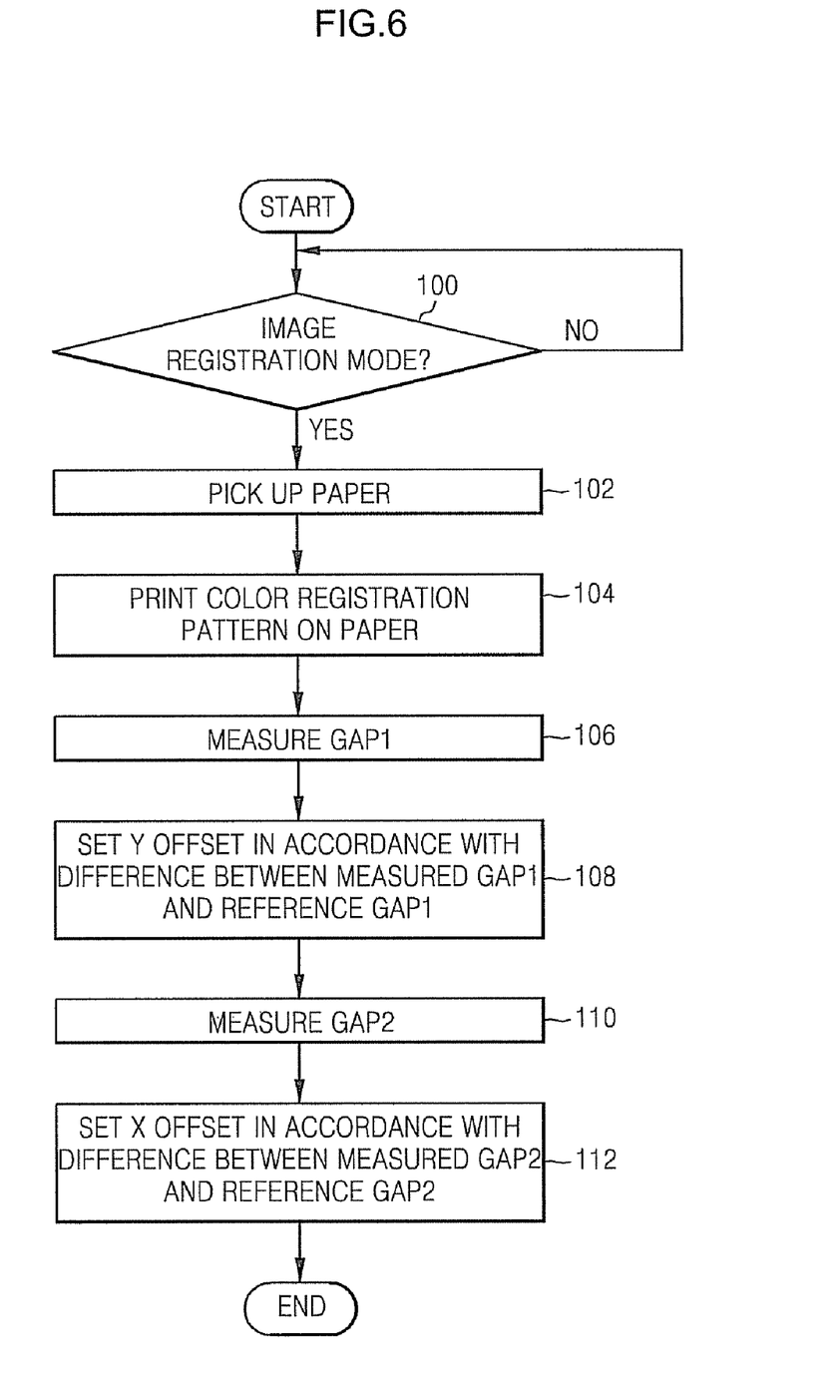
FIG. 6 is a flowchart illustrating an auto color registration method, according to aspects of the present invention.

An auto color registration method configured as described above, according to aspects of the present invention, will be described below with respect to the accompanying FIG. 6. In operation 100, the image signal processing controller 61 determines whether an image registration mode is activated. The image signal processing controller 61 determines whether to activate an image registration mode, by inspecting: whether a setting instruction, for the image registration mode, is input by a user; whether the number of accumulated print papers reaches a set value; or whether a power source was recently turned on or off.

In operation 102, after the image registration mode is activated, the pick-up roller 11 picks the paper S, from the paper feeding unit 16, and a test pattern AcPt is printed on the paper S. In operation 104, the paper S is conveyed by the transfer unit 20 and passed between the paper transfer belt 21 and the respective photosensitive drums 12, 13, 14, and 15.

In operation 106, the color registration sensor 60 receives light reflected by the test pattern, printed on the paper S, and then provides a sensing signal to the image signal processing controller 61. The image signal processing controller 61 measures a first distance Gap1 by multiplying a first required time t1 by a paper transfer speed v1. The first required time t1 is the time period between when the point P0 is sensed and when the point P5 is sensed.

In operation 108, a Y offset is set in accordance with a difference between the measured first distance Gap1 and a predetermined first reference distance. For example, if the measured first distance Gap1 is shorter than the first reference distance, the image signal processing controller 61 resets the Y offset, such that the printing time of a color image is advanced with respect to the paper transfer direction. If the measured first distance Gap1 is greater than the first reference distance, the image signal processing controller 61 outputs a Y offset setting signal to the offset setting unit 62, to reset the Y offset, such that the printing time of a color image is delayed with respect to the paper transfer direction. Accordingly, the offset setting unit 62 sets an offset in accordance with the Y offset setting signal and provides the Y offset setting information to the image signal processing controller 61, hereafter.

In operation 110, the image signal processing controller 61 measures a second distance Gap2, by multiplying a second required time t2 by a paper transfer speed v1. The second required time t2 is the time period between when two points in a color pattern are sensed.

In operation 112, an X offset is set in accordance with a difference between the measured second distance Gap2 and a predetermined second reference distance. For example, when the test pattern printed on the paper S is disposed to the left or right, by a predetermined distance from the reference line Z-Z, the image signal processing controller 61 outputs an X offset setting signal, for correcting the X offset, to the offset setting unit 62. The offset setting unit 62 adjusts the printing position of a photosensitive drum to the left or right, according to the predetermined distance. Accordingly, the offset setting unit 62 provides the corrected X offset to the image signal processing controller 61.

According to various embodiments, the detection operations for the X and Y offsets can be repeated for each color pattern. The offset information from each color pattern can be used to set the X and Y offsets for each of the photosensitive drums 12, 13, 14, and 15.

As described above, aspects of the present invention provide an auto color registration apparatus and method, wherein a test pattern is inspected by using a sensor, without performing an additional scanning operation. Offset information can be set to allow a color image to be positioned at the correct printing position, thereby easily and smoothly performing an auto color registration operation, even in a color image forming apparatus that has no scanner.

Further, aspects of the present invention provide an auto color registration apparatus and method, wherein an image registration operation for each color and an auto color registration operation can be simultaneously performed, by inspecting a test pattern. The method rapidly and effectively performs an auto color registration operation and greatly improves convenience.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   a printing unit to print color patterns on a paper, each color pattern corresponding to a different toner color, and comprising a reference pattern aligned on an X-axis direction across a width of the paper, and an inspection pattern inclined relative to the reference pattern by a predetermined angle;

a color registration sensor to detect a first point in the reference pattern and a second point in the inspection pattern, of at least one of the color patterns, and an edge of the paper which is parallel to the X-axis direction;

a controller to measure a first distance between the first and second points, and a second distance between one of the first point and the edge of the paper; and an offset setting unit to set an X offset and a Y offset of the printing unit, according to the measured first and second distances.

2. The image forming apparatus as claimed in claim 1, wherein the controller determines the Y offset, in accordance with the measured second distance.

3. The image forming apparatus as claimed in claim 1, wherein the controller determines the X offset, in accordance with the measured first distance.

4. The image forming apparatus as claimed in claim 3, wherein the controller measures the first distance, based on a time interval between a sensing time of the first point and a sensing time of the second point, and a paper transfer speed.

5. The image forming apparatus as claimed in claim 1, wherein the color registration sensor is disposed adjacent to a transfer path of the paper.

6. The image forming apparatus as claimed in claim 1, wherein the color image sensor is an optical sensor.

7. The image forming apparatus as claimed in claim 1, wherein the controller determines the Y offsets, in accordance with the measured second distances.

8. The image forming apparatus as claimed in claim 1, wherein the controller determines the X offsets, in accordance with the measured first distances.

9. The image forming apparatus as claimed in claim 8, wherein the controller measures the first distances, based on a time interval between a sensing time the first points and a sensing time of the second points of each of the color patterns, and a paper transfer speed.

10. The image forming apparatus as claimed in claim 8, wherein the controller measures the second distances, based on time intervals between a sensing time the first points and a sensing time of the edge of the paper, and a paper transfer speed.

11. An auto color registration method of an image forming apparatus, the method comprising:

printing color patterns on a paper, each color pattern comprising a reference pattern having a long axis in an X-axis direction extending across a width of the paper, and an inspection pattern having a long axis inclined relative to the reference pattern by a predetermined angle;

detecting the position of at least one of the color patterns on the paper, by detecting first and second points of the at least one color pattern, and detecting an edge of the paper, which is parallel to the X-axis direction; and setting an X offset and a Y offset of a color image to be printed, according to the detected position of the at least one color pattern.

12. The auto color registration method as claimed in claim 11, wherein:

the detecting of the position comprises measuring a first distance between the first point and the edge; and the setting of the Y offset comprises comparing the first distance with a reference distance.

13. The auto color registration method as claimed in claim 12, wherein the setting of the Y offset comprises adjusting a paper transfer time, according to a comparison result between the first distance and the reference distance.

14. The auto color registration method as claimed in claim 12, wherein the setting of the X offset comprises multiplying a time interval, between when the edge is detected and when the first point is detected, by a paper transfer speed.

15. The method as claimed in claim 12, wherein:

the detecting of the position further comprises detecting first points in each of the color patterns and the edge and determining distances between the first points and the edge; and the setting of the Y offset comprises comparing the determined distances with reference distances, and setting Y offsets corresponding to each of the color patterns.

16. The method as claimed in claim 12, wherein:

the detecting of the position further comprises measuring distances between first points and the second points of each color pattern; and the setting of the X offset comprises comparing the second distances with a reference distance and setting X offsets corresponding to each of the color patterns.

17. The method as claimed in claim 16, wherein the first points are disposed in the reference patterns, and the second points are disposed in the inspection patterns.

18. The auto color registration method as claimed in claim 11, wherein:

the detecting of the position comprises detecting a second distance between the first and second points; and the setting of the X offset comprises comparing the second distance with a reference distance.

19. The auto color registration method as claimed in claim 18, wherein the first point is aligned on the reference pattern and the second point is aligned on the inspection pattern, of the at least one color pattern.

20. The auto color registration method as claimed in claim 18, wherein the setting of the X offset comprises multiplying a time interval, between when the first point is sensed and when the second point is sensed, by a paper transfer speed.

21. The auto color registration method as claimed in claim 11, wherein the first and second points are aligned in a Y-axis direction, which is perpendicular to the X-axis direction.

22. The auto color registration method as claimed in claim 11, wherein the detecting of the position comprises detecting the first and second points from each of the color patterns.

23. An image forming apparatus comprising:

a printing unit to print color patterns on a paper, each color pattern corresponding to a different toner color, and comprising a reference pattern aligned on an X-axis direction across the width of the paper, and an inspection pattern inclined relative to the reference pattern by a predetermined angle;

a color registration sensor to detect a first point in each of the reference patterns, a second point in each of the inspection patterns, and an edge of the paper, which is parallel to the X-axis direction;

a controller measure first distances between the first and second points of each of the color patterns, and second distances between the first points and the edge of the paper; and an offset setting unit to set X offsets and Y offsets of the printing unit, according to the measured first and second distances.

* * * * *

UNITED STATES PATENT AND TRADEMARK OFFICE
CERTIFICATE OF CORRECTION

PATENT NO. : 7,616,918 B2
APPLICATION NO. : 11/949219
DATED : November 10, 2009
INVENTOR(S) : Wan Joon Jeon It is certified that error appears in the above-identified patent and that said Letters Patent is hereby corrected as shown below:

Title page, Column 2, Line 1, before "2003-136794", change "KR" to --JP--.

Signed and Sealed this

Sixth Day of July, 2010

David J. Kappos
*Director of the United States Patent and Trademark Office*